United States Patent
Steinert

(10) Patent No.: US 7,796,149 B2
(45) Date of Patent: Sep. 14, 2010

(54) METHOD FOR SCANNER CONTROL IN AT LEAST ONE SCAN AXIS IN A LASER SCANNING MICROSCOPE

(75) Inventor: Joerg Steinert, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 1081 days.

(21) Appl. No.: 10/583,346

(22) PCT Filed: Dec. 16, 2004

(86) PCT No.: PCT/EP2004/014318

§ 371 (c)(1),
(2), (4) Date: Jun. 19, 2006

(87) PCT Pub. No.: WO2005/064913

PCT Pub. Date: Jul. 14, 2005

(65) Prior Publication Data

US 2007/0146472 A1    Jun. 28, 2007

(30) Foreign Application Priority Data

Dec. 19, 2003    (DE) ................. 103 59 734

(51) Int. Cl.
*G02B 21/00* (2006.01)
*H04N 1/047* (2006.01)
(52) U.S. Cl. ..................................... 347/224

(58) Field of Classification Search .................. 347/111, 347/129, 224
See application file for complete search history.

(56) References Cited

U.S. PATENT DOCUMENTS

| | | | |
|---|---|---|---|
| 4,689,491 A | 8/1987 | Lindow et al. | |
| 6,032,167 A | 2/2000 | Takatsu | |
| 6,037,583 A | 3/2000 | Moehler et al. | |
| 6,631,226 B1 | 10/2003 | Schoeppe et al. | |
| 6,650,441 B1 | 11/2003 | Horigome et al. | |
| 2002/0083609 A1 | 7/2002 | Melzer et al. | |

FOREIGN PATENT DOCUMENTS

| | | |
|---|---|---|
| DE | 197 02 752 | 7/1998 |
| DE | 19702 753 | 7/1998 |
| DE | 0 883 278 | 12/1998 |

OTHER PUBLICATIONS

International Preliminary Report for PCT/EP2004/014318, issued on Aug. 29, 2006.*

* cited by examiner

*Primary Examiner*—Huan H Tran
(74) *Attorney, Agent, or Firm*—Jacobson Holman PLLC

(57) ABSTRACT

Method for scanner control in at least one scan axis in a laser scanning microscope, the scan field being divided into partial area, a first image of at least one partial area produced by a forward scan being compared with a second image of the partial area produced by a back scan and a correction value for the scanner control determined from the deviation between the first and second image.

15 Claims, 4 Drawing Sheets

Slice direction for the strips

Displacement direction to
determine the error of the X scanner

Correlation of partial images of the forward or back scan in the x scanner direction (example cross-grid sample, for example 20 μm grid):

Correlation in the y scanner direction:

Slice direction for the strips

Displacement direction to determine the error of the X scanner

METHOD FOR SCANNER CONTROL IN AT LEAST ONE SCAN AXIS IN A LASER SCANNING MICROSCOPE

CROSS-REFERENCE TO RELATED APPLICATIONS

This is a nationalization of PCT/EP2004/014318 filed 16 Dec. 2004 and published in German.

BACKGROUND OF THE INVENTION

Methods for scanner control in a laser scanning microscope are described, for example, in U.S. Pat. No. 6,037,583.

Despite calibration (for example, by a linear electrical signal) of the scanner, fraying of vertical lines as the result of phase differences between the forward and back scan (bidirectional deviations) occurs, caused by:
1. Long-term changes of scanner response
2. Temperature/load-related fluctuations
3. Zoom dependence of scanner response.

This problem is to be corrected by the invention.

SUMMARY OF THE INVENTION

This task is solved by a method for scanner control in at least one scan axis in a laser scanning microscope, in which the scan field is subdivided into partial regions, a first image of at least one partial region generated by a forward scan being compared with a second image of the partial region generated by a back scan and a correction value being determined for the scanner control from the deviation between the first and second images.

In one embodiment of the invention, the step of subdividing the scan field into partial regions comprises dividing the scan field into strips that form the partial regions. In this embodiment, the slice direction of the strips lies parallel to the image edge of the scan field.

In another embodiment, the longitudinal axis of the strips during line-by-line scanning is perpendicular to the direction of the scan lines in the image.

In still another embodiment, in the determining step, the correlation of partial images (that is, images of the partial regions) is determined for each scan axis.

In still another embodiment, deviations are determined from the correlation of the partial areas. The deviations can be combined as data points for a deviation curve and this deviation curve is used to determine a correction value of the scanner control.

The deviation curve can be correlated with the individual frequency fractions of the scanner control (sine curves) for determination of the correction of the scanner control and correction values for the scanner control are determined via the correlation values.

The method can further comprise the step of storing correction values for the scanner control together with the time the correction values are determined.

A comparison is carried out of correction values recorded at different times.

The frequency of the scanner can be controlled or corrected with the determined correction values.

In the step of subdividing the scan field, the slice direction of the partial image can lie parallel to an image edge of the scan field.

Alternatively, in the step of subdividing the scan field, the slice direction of the partial images can agree with a scan axis, or it can have an angle to at least one scan axis.

In the step of determining a correction value, a test pattern can be used to determine the correction value.

DETAILED DESCRIPTION OF THE PREFERRED EMBODIMENTS

The underlying idea of the invention is to carry out evaluation of a scan image by investigating it for bidirectional deviations and conducting a continuous correction of the coefficients for scanner control during microscope operation (for example, between scans).

The invention is further explained below by means of schematic representations.

Figure 1:
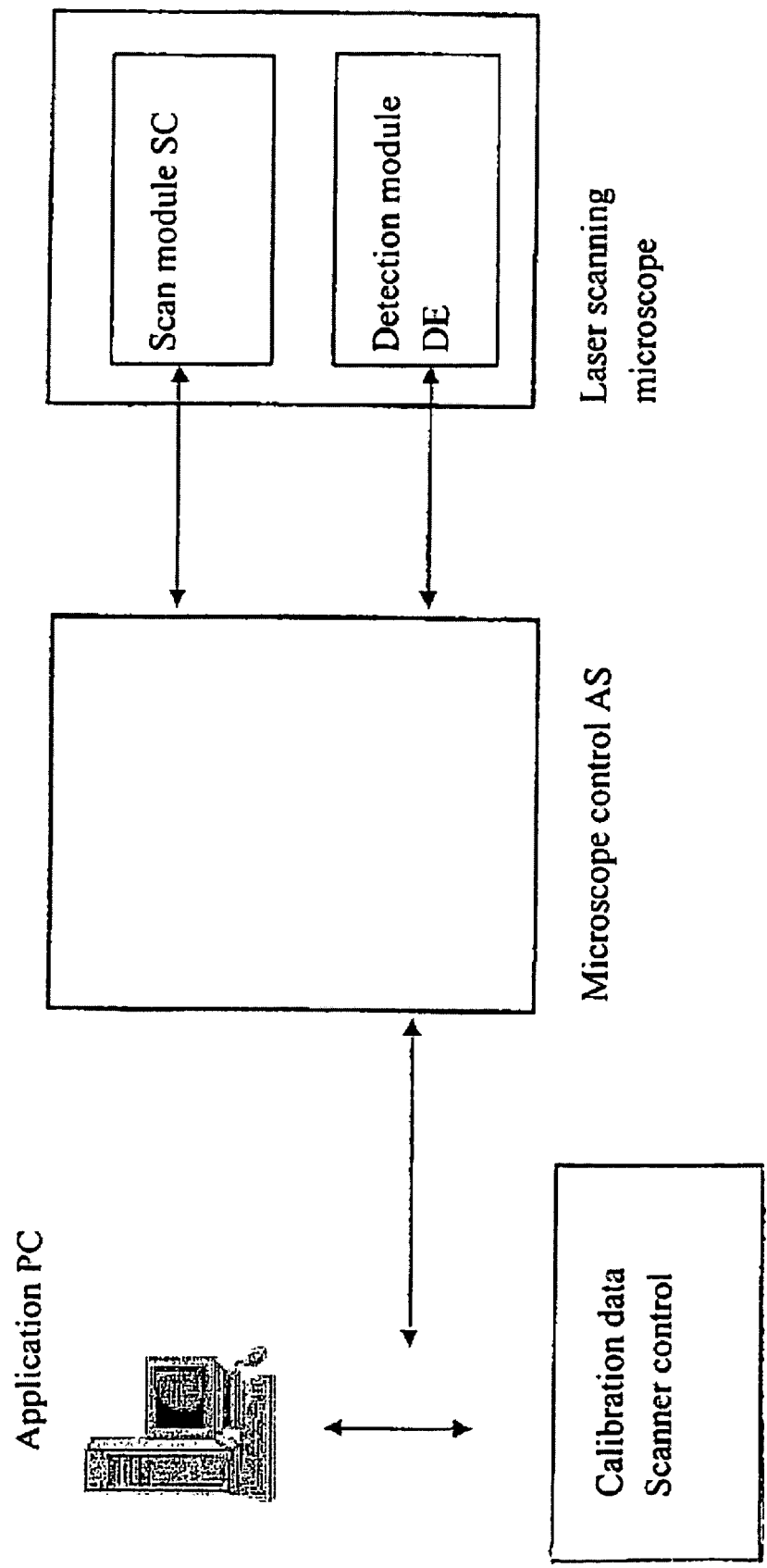
FIG. 1 is a diagrammatic illustration of a laser scanning microscope with a scan module and a detection module.

FIG. 1 shows a laser scanning microscope LSM with a scan module SC and a detection module DE.

Additional details are known from U.S. Pat. No. 6,631,226.

Control of the scan module SC and detection module DE, as well as feedback of detection of the control state occur via a control unit AS, for example, a real-time computer.

Control unit AS is connected to a PC as a user interface.

Image evaluation according to the invention and a change in control data for the scanner can occur in the real-time computer or PC.

Figure 2A:
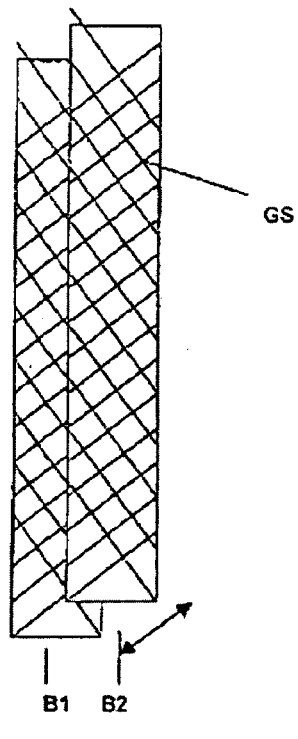
FIGS. 2a and 2b are diagrams illustrating an example of the basic principle of the invention.
Figure 2B:
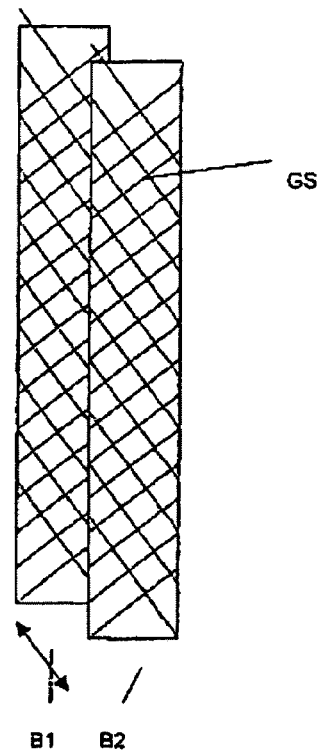

FIGS. 2a and 2b show an example of the basic principle.

Here the strip-like partial images B1, B2 for the forward and back scan are shown by means of a scanned cross grid sample with grid strips GS, in FIG. 2a in the X scanner direction and in FIG. 2b in the Y scanner direction. Partial images B1, B2 are brought together and correlated with each other, i.e., made congruent by displacement, and the correction values determined.

Figure 3:
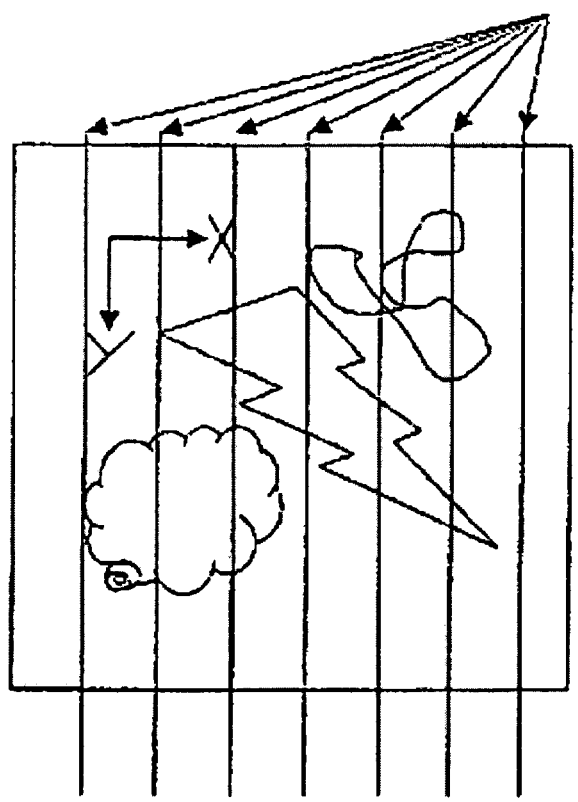
FIG. 3 is a diagram showing the slice direction of partial images used to determine the error of the X scanner in accordance with the present invention.
Figure 3:

FIG. 3 shows that the slice direction of the strip-like partial images B1, B2 to determine the error of the X scanner occurs perpendicular to the X direction, i.e. in the Y direction (unrotated scan).

Since the Y scanner is at rest between scan lines, determination of the error in the Y direction is not possible here.

A detailed evaluation of image distortions caused by line movement of the scanner is possible if the image is sliced into strips perpendicular to the scan lines and each strip evaluated by itself. The overall trend of the bidirectional deviations within a scan line is then obtained. Knowledge of this trend permits better correction than a simple displacement between forward and back lines constant over the entire image.

Unrotated Scan Variant

This means that one of the scanners operates as a fast line scanner (hereafter referred to as X scanner) and the other scanner as a slow line scanner (hereafter referred to as Y scanner). The Y scanner advantageously jumps during the reversal phases of the X scanner from line to line (line advance) and is at rest during actual data recording. This rotational direction of the scan is referred to subsequently as 0° scan angle. The slice direction for the strips is parallel to the image edge and also parallel to the Y direction for 0° scan angle.

The displacement direction to determine the error of the X scanner is parallel to the scan direction of the X scanner, i.e., the two partial images of the even and odd scan lines (forward and back scan) are displaced relative to each other along the direction in the figure that is predetermined by movement of the X scanner, i.e., parallel to the scan lines at 0° scan.

A determination of the error of the Y scanner is not possible at 0° scan (Y scanner at rest during scan lines).

Figure 4:
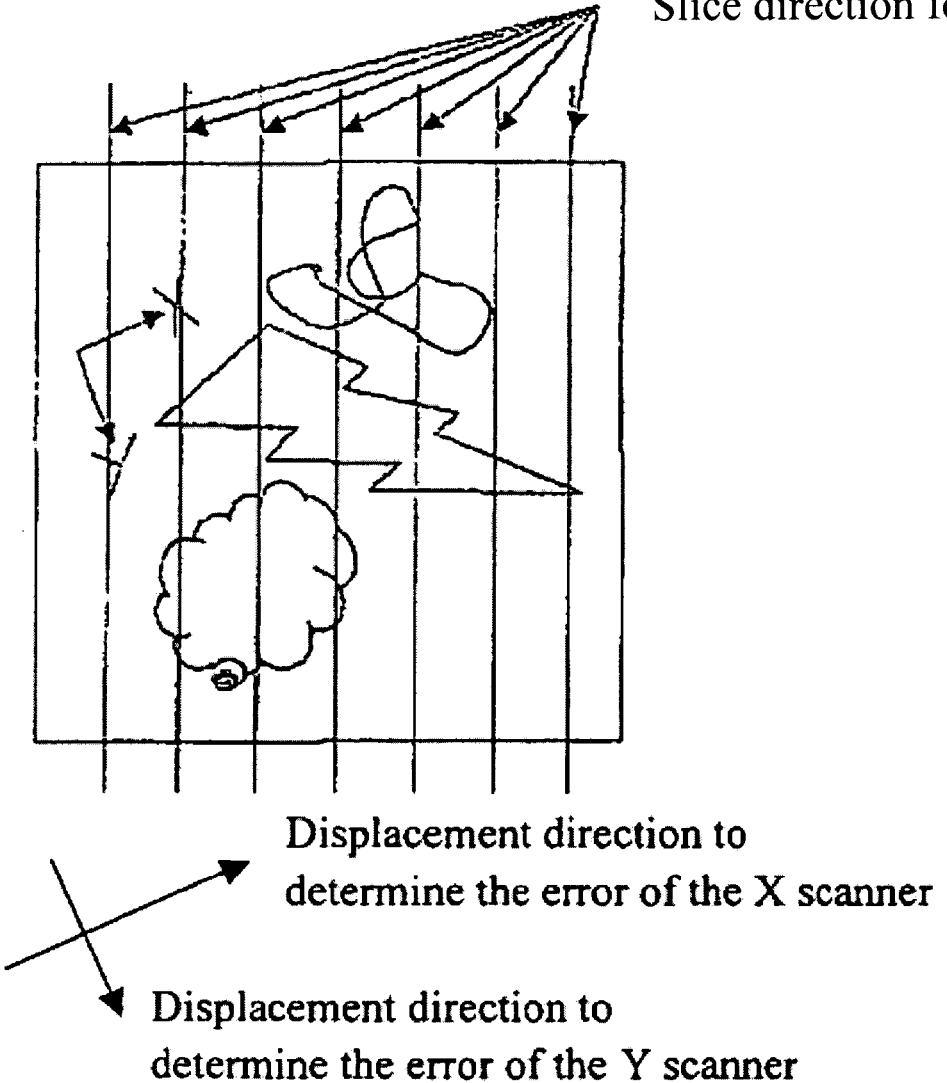
FIG. 4 shows the case of a rotated scan.

FIG. 4 shows the case of a rotated scan (scan angle not equal to 0°, 180°, 90° and −90°). In this case both scanners operate synchronously as line scanners. Between the scan lines both scanners advantageously jump during the reversal times of both scanners to the next line. By adjusting the scan amplitudes of both scanners, the scan angle (orientation of the scan line in the sample) is adjusted. In this case the slice direction for the strip-like partial images occurs at an angle to the scan directions X and Y. The slice direction also lies here essentially in the edge direction of the scanned image.

To determine the error of the X scanner, a shift of the partial images from the forward and back scan occurs in the X direction (that is, in the direction of the X scanner, not the direction of the scan lines), to determine the Y error in the Y direction (that is, in the direction of the X scanner, not the direction of the scan lines).

The corresponding correction is determined in each case and the correction vector determined from both values.

Rotated Scan Variant, i.e., Scan Angle not Equal to 0°, 90°, −90° and 180°:

The X scanner and Y scanner move quickly and both scanners jump a little bit between lines.

When both scanners start simultaneously with the same amplitude, the light point in the sample does not move from left to right but from bottom left to top right (for example) —greater than 45° rotated scan. If the Y scanner moves with only half amplitude, the light spot goes from bottom left to the half top right —greater than about 22° scan angle. Between the rotated scan lines, both scanners jump a little bit (constant offset of movement superimposed) so that the next scan line lies next to the last one.

The slice direction for the strips is also advantageously parallel to the image edge, perpendicular to the direction of the scan lines.

The displacement direction to determine the error of the X scanner is parallel to the scan direction of the X scanner, i.e., the two partial images of the even and odd scan lines (forward and back scan) are displaced relative to each other along a direction of the image predetermined by movement of the X scanner (the direction along which the light spot would move in the sample if the X scanner were moved alone).

The displacement direction to determine the error of the Y scanner is parallel to the scan direction of the Y scanner.

It can also be useful, in order to determine the time trend of the image distortion, to also break down the image parallel to the direction of the scan lines.

In a rotated scan the scanner is scanned not along the scan lines but "obliquely" through the image. The directions of both scan movements are then essential for the bidirectional deviations, not the direction of the scan lines.

Determination of the Bidirectional Deviations Occurs as Follows:
  Slicing of the image into (for example) 10 equally wide strips, preferably along the slow scan axis (slice perpendicular to the fast axis)
  Slicing of the strips in the two partial images from the forward scan and back scan (if necessary filling in the missing lines with the average value of the adjacent lines)
  Calculation of (one-dimensional) cross-correlation functions of the two partial images along the two scan directions (the following evaluation occurs for both scan directions in order to be able to correct both scanners) during displacement of the two partial images relative to each other, all of the image data can actually be utilized, i.e., missing data in the edge region of the partial images are taken from the neighboring strips
  Evaluation of these correlation functions:
    position of the maximum: at this displacement length the two partial images best fit each other, i.e., this displacement is the desired correction of the bidirectional deviation on the image position on which the strip is situated
    half-width and half-height of the peak: gauge of the accuracy of measurement. The cross correlation function is normalized, for example, to the autocorrelation(s) of the two partial images, i.e., a correlation of 1 means that the two partial images agree exactly during this displacement.
  At rotation angles that deviate less than (for example) 10° from the main axis of the scanner, only this scanner should be evaluated (for example, in a 0° scan only the X scanner can be evaluated)
  The position of the peaks of the individual image strips yield a curve per scan direction (x, y) with, for example, 10 data points (number of image strips) for the bidirectional deviation in the image.
  Depending on the accuracy of the measurement (half-width and half-height of the cross-correlation peaks) these data points should advantageously be marked with weighting factors or, if unusable, discarded.

Correction of the scanner control occurs advantageously via the coefficients of a Fourier series from the signal curves of the scanner control signals.

The correction of the scanner coefficient then occurs as follows:
  Determination of the scanner coefficient that best corrects the found deviation curve. Correlation of the measured deviation curve with $\sin(1f)$, $\sin(2f)$, $\sin(3f)$, . . . (which coefficient yields the maximum correlation with the measured deviation curve), where $1f$, $2f$, $3f$. . . are the individual frequency fractions of the scanner control
  The phase error of the coefficient can be calculated from the correlation value (large amplitude of the deviation curve=large phase error of the coefficient). When the deviation is caused only by a coefficient, a sine curve with nodal points at the reversal points of the scanner is always present (outside of the image).
  Correction of the phase of the coefficient (amplitude is advantageously not changed in order to obtain the long-term linearity of scanner movement).
  The phase of the concerned coefficient could also not be fully corrected, depending on the quality of the measurement (weighting factors, see above). The finally valid correction then occurs, for example, during the next scan images.
  In this way with each scan (at least) one coefficient could be corrected. By correlation of the deviation curve with several scanner frequencies, several coefficients can also be corrected in one step (depending on the accuracy of measured values).

Over time a parameter field can be produced on the control computer of the microscope with scanner coefficients that are permanently adjusted.

The parameters are, for example: speed, zoom (for example zoom 0.7, 0.8, 1, 2, 4, 8).

If an intermediate zoom is used, interpolation can occur from neighboring coefficients and in similar fashion the neighboring coefficients (also with weighting) can be adjusted after a deviation measurement.

The parameter field on the hard disk can only slowly change advantageously (for example, weighted average between daily average and present value in the files).

In addition, a further relatively rapidly variable parameter field can occur in that a reaction occurs to temperature fluctuations during the day (according to possibility, evaluated after each image).

A correction of the active coefficient could also occur during deviations greater than a predetermined threshold (for example, a value adjustable by the user).

This parameter field is also recorded and stored.

Depending on the deviation width and quality of this day-parameter on completion of the LSM program, the field stored on the hard disk could be adjusted (possible parameters for weighting: deviation width of the measured deviations, value number, operating hours, etc.). The on-line correction can be switched off, i.e., the user can have the possibility of activating or suppressing the mechanism of automatic correction of the scanner control. The original calibration set from the plant can be stored for evaluations of development of the mechanical and electrical behavior of the scanner and the copy can be permanently stored. The parameter set on the hard disk can also be reset (by means of the original calibration).

A comparison of the formed parameter set with the original set could lead, for example, to a recommendation on the screen for the user "Please calibrate the scanner again" (the threshold value could be different according to scan speed).

In multichannel images (during the scan different data are recorded, for example, for each image pixel with several detectors) all channels could be evaluated and compared separately (the scanner-related image distortion should be the same in all images).

Through the described correction, in addition to approved bidirectionality, an improvement in linearity is also possible, since the coefficients can be exactly shifted with reference to their phase.

The invention claimed is:

1. A method for scanner control in at least one scan axis in a laser scanning microscope in which a scan field is scanned line-by-line, comprising the steps of:

dividing the scan field into strips, in which the longitudinal axis of the strips is perpendicular to the direction of the scan lines;

subdividing the strips into a respective first partial image of forward scan lines and a respective second partial image of back scan lines;

for each strip, comparing at least the respective first partial image with at least the second partial image to determine deviations between the first and second partial images; and determining correction values for scanner control from the deviations between the first and second partial images.

2. The method according to claim 1, in which the strips are sliced in a direction parallel to the image edge of the scan field.

3. Method according to claim 1, in which in the determining step, the correlation of partial images is determined for each scan axis.

4. Method according to claim 1, in which in the determining step, deviations are determined from the correlation of the partial images.

5. Method according to claim 4, in which in the determining step, the deviations are combined as data points for a deviation curve and the deviation curve is used to determine a correction value of the scanner control.

6. Method according to claim 5, in which in the determining step, the deviation curve is correlated with the individual frequency fractions of the scanner control for determination of the correction of the scanner control and correction values for the scanner control are determined via the correlation values.

7. Method according to claim 6, in which when the deviations are caused only by a coefficient, a sine curve with nodal points at the reversal points of the line scan is always present.

8. Method according to claim 1, further comprising the step of storing the correction values for the scanner control together with the time the correction values are determined.

9. Method according to claim 8, further comprising the step of comparing the correction values recorded at different times.

10. Method according to claim 1, further comprising the step of controlling or correcting the frequency of the scanner with the determined correction values.

11. Method according to claim 1, in which in the step of subdividing the scan field, the slice direction of the partial image lies parallel to an image edge of the scan field.

12. Method according to claim 1, in which in the step of subdividing the scan field, the slice direction of the partial images agrees with a scan axis.

13. Method according to claim 1, in which in the step of subdividing the scan field, the slice direction of the partial images is at an angle to at least one scan axis.

14. Method according to claim 1, in which in the step of determining a correction value, a test pattern is used to determine the correction value.

15. Method according to claim 1, wherein offsets between the partial images are determined as the deviations by shifting the partial images in parallel with at least one of the scan axis and a second scan axis in such a way that they fit together best.

* * * * *